US010592392B2

(12) United States Patent
Breitgand et al.

(10) Patent No.: US 10,592,392 B2
(45) Date of Patent: Mar. 17, 2020

(54) SYSTEM AND METHOD FOR PREDICTIVE PERFORMANCE ANALYSIS VIA DYNAMIC BENCHMARK GENERATION

(71) Applicant: International Business Machines Corporation, Armonk, NY (US)

(72) Inventors: David Breitgand, Modiin (IL); Alex Glikson, Haifa (IL); Doron Podoleanu, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 15/351,467

(22) Filed: Nov. 15, 2016

(65) Prior Publication Data

US 2018/0137027 A1 May 17, 2018

(51) Int. Cl.
*G06F 11/36* (2006.01)
*G06F 11/34* (2006.01)
(52) U.S. Cl.
CPC ...... *G06F 11/3636* (2013.01); *G06F 11/3428* (2013.01); *G06F 11/3447* (2013.01); *G06F 11/3604* (2013.01); *G06F 11/3624* (2013.01)
(58) Field of Classification Search
CPC .......................... G06F 11/3636; G06F 11/3624
USPC ....................................................... 717/131
See application file for complete search history.

(56) References Cited

U.S. PATENT DOCUMENTS

| | | | | |
|---|---|---|---|---|
| 6,564,175 B1* | 5/2003 | Hady | ............... | G06F 11/3447 702/178 |
| 8,566,803 B2* | 10/2013 | Branson | ............... | G06F 11/3428 702/182 |
| 9,208,053 B2* | 12/2015 | Kejariwal | ........... | G06F 11/3419 |
| 2004/0167765 A1* | 8/2004 | Abu El Ata | ............ | G06F 17/10 703/22 |
| 2014/0350912 A1* | 11/2014 | Kejariwal | ........... | G06F 11/3419 703/22 |
| 2015/0268953 A1* | 9/2015 | Koezuka | ................... | G06F 8/71 717/121 |
| 2015/0341229 A1* | 11/2015 | Richter | ............... | H04L 41/5035 709/224 |
| 2017/0262362 A1* | 9/2017 | Duttagupta | ......... | G06F 11/3688 |
| 2018/0137027 A1* | 5/2018 | Breitgand | ........... | G06F 11/3624 |

OTHER PUBLICATIONS

Aashish Phansalkar et al., "Performance Prediction using Program Similarity", PACT '06 Proceedings of the 15th international conference on Parallel architectures and compilation techniques pp. 114-122, 2006.

(Continued)

*Primary Examiner* — Lewis A Bullock, Jr.
*Assistant Examiner* — Theodore E Hebert
(74) *Attorney, Agent, or Firm* — Gregory J. Kirsch (57) ABSTRACT

This invention relates to generating benchmarks without the need for executing the application on a specific benchmarking platform or by testing the application against known inputs and outputs. Instead, the system, in an embodiment, allows for source code comparisons to known systems to predict performance. The benchmarking can be done for varying deployment platforms and various usage patterns. The source code comparison process allows for fast performance prediction by using a distance vector.

17 Claims, 5 Drawing Sheets

(56) References Cited

OTHER PUBLICATIONS

Bogdan Florin Cornea and Julien Bourgeois., "Performance Prediction of Distributed Applications Using Block Benchmarking Methods", Parallel, Distributed and Network-Based Processing (PDP), 2011 19th Euromicro International Conference on: Feb. 9-11, 2011.
Rafael H. Saavedra et al., "Analysis of Benchmark Characteristics and Benchmark Performance Prediction", Journal ACM Transactions on Computer Systems (TOCS) TOCS Homepage archive, vol. 14 Issue 4, Nov. 1996, pp. 344-384.
Pedro C. Diniz., "A Compiler Approach to Performance Prediction using Empirical-based Modeling", Chapter Computational Science—ICCS 2003, vol. 2659 of the series Lecture Notes in Computer Science pp. 916-925.

* cited by examiner

SYSTEM AND METHOD FOR PREDICTIVE PERFORMANCE ANALYSIS VIA DYNAMIC BENCHMARK GENERATION

FIELD OF TECHNOLOGY

The present invention relates to the technical field of benchmarking applications and brokerage. In particular, the present invention relates to analyzing source code to characterize the application so as to predict the performance of the application on various sets of infrastructure

BACKGROUND OF THE INVENTION

When developing and deploying a new application or system on a cloud or private data center, several problems arise. Applications and systems contain bottlenecks that constrain performance. Furthermore, sizing the application or system efficiently in terms of computing resources, parallelization, or other aspects has to be done carefully.

Typically, a set of benchmark tests are performed. These benchmark tests can be composed of industry standard software tests to determine the performance levels of the system. The benchmark can also compose a set of inputs and expected outputs to test the performance of a software system. Pre-production testbeds can be a cost ineffective solution. These testbeds can require dedicated infrastructure and trained teams. Furthermore, standard benchmarks are broadly applicable and are not specifically tailored for the system or application under consideration. The time, cost, and effort required often make such benchmarking beyond the reach of application developer or owner. For example, an application developer may need to decide on which cloud service provider's infrastructure to use and how to configure an application to run on the infrastructure in a cost effective way. The application developer may also need to decide on which resources to use for application deployment in such a cloud brokerage scenario. In this scenario, it may be too cost prohibitive for a cloud broker to benchmark the application directly against all the providers. Rather, a method allowing to accurately predict performance of an application at a given provider infrastructure without actually performing full testing is needed. That is, there is a need for a method that can predict the performance of an application accurately.

SUMMARY OF INVENTION

This summary is provided with the understanding that it will not be used to limit the scope or meaning of the claims.

Embodiments of the present invention may provide the capability to benchmark applications and/or systems based on static source code analysis. The disclosure finds similarities between (a) the source code of the application being analyzed and other applications and (b) workload descriptor of the analyzed application and those of the applications that have been run in the past on a given infrastructure. Next, the similarities are used to predict performance of the given application on specific infrastructure alternative under specified workload conditions. This is termed "predictive benchmarking" and the system generates a predictive performance result or a predictive benchmark result. The results can comprise information such as run time, response time, or resources used, such as, floating point operations performed, memory used, network access performed, or disk write performed. Using prediction rather than running the application or using a purely synthetic benchmark avoids cumbersome and inaccurate benchmarking processes.

In an embodiment, a system for benchmarking, the system comprises a custom benchmarks repository, a standard benchmark repository, and a server configured to receive an application source code and a usage description, perform static analysis on the application source code to determine a similarity to known application classes, perform analysis on the usage description to determine a similarity to known usage, and if the similarity to known application classes is below the first threshold or the similarity to known usage is below the second threshold, generate a new custom benchmark from the application, execute it on the infrastructure alternative, and add the new benchmark to the custom benchmarks repository.

In optional embodiments, the server is further configured to perform the steps: if the similarity to known application classes is above a first threshold and the similarity to known usage is above a second threshold, generate a predictive benchmark result. In alternative embodiments, the predictive benchmark result is based on the infrastructure alternative. In preferred embodiments, generating the new custom benchmark comprises generating an application skeleton from static code analysis and using the application skeleton along with the workload descriptor as the new custom benchmark. In embodiments, the system further comprising a workload analyzer. The workload analyzer may be configured to receive from the server the usage description and select at least one standard benchmark from a standard benchmarks repository. In preferred embodiments, the standard benchmark repository comprises at least one standard benchmark source code. In alternative embodiments, the usage description comprises an expected number of connections, an expected transaction type, an expectation for business cycle, an expectation for trends in demand, a maximal number of requests of a given type, and/or a minimal number of requests of a given type. In preferred embodiments, generating a performance prediction result comprises using a historic run result in a historic run repository.

In a further embodiment, a method for benchmarking an application comprises receiving a source code for the application, receiving a usage description, performing static analysis on the source code to generate a first closeness metric, performing analysis on the usage description to generate a second closeness metric, and if the first closeness metric is above a first threshold and the second closeness metric is above a second threshold for a given infrastructure, generating a performance prediction result for the application source code.

Numerous other embodiments are described throughout herein. All of these embodiments are intended to be within the scope of the invention herein disclosed. Although various embodiments are described herein, it is to be understood that not necessarily all objects, advantages, features or concepts need to be achieved in accordance with any particular embodiment. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

The methods and systems disclosed herein may be implemented in any means for achieving various aspects, and may be executed in a form of a machine-readable medium embodying a set of instructions that, when executed by a machine, cause the machine to perform any of the operations disclosed herein. These and other features, aspects, and advantages of the present invention will become readily apparent to those skilled in the art and understood with reference to the following description, appended claims, and accompanying figures, the invention not being limited to any particular disclosed embodiment(s).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

Other features of the present embodiments will be apparent from the Detailed Description that follows.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical and structural changes may be made to the embodiments without departing from the spirit and scope of the present teachings. The following detailed description is therefore not to be taken in a limiting sense, and the scope of the present disclosure is defined by the appended claims and their equivalents.

Figure 1:
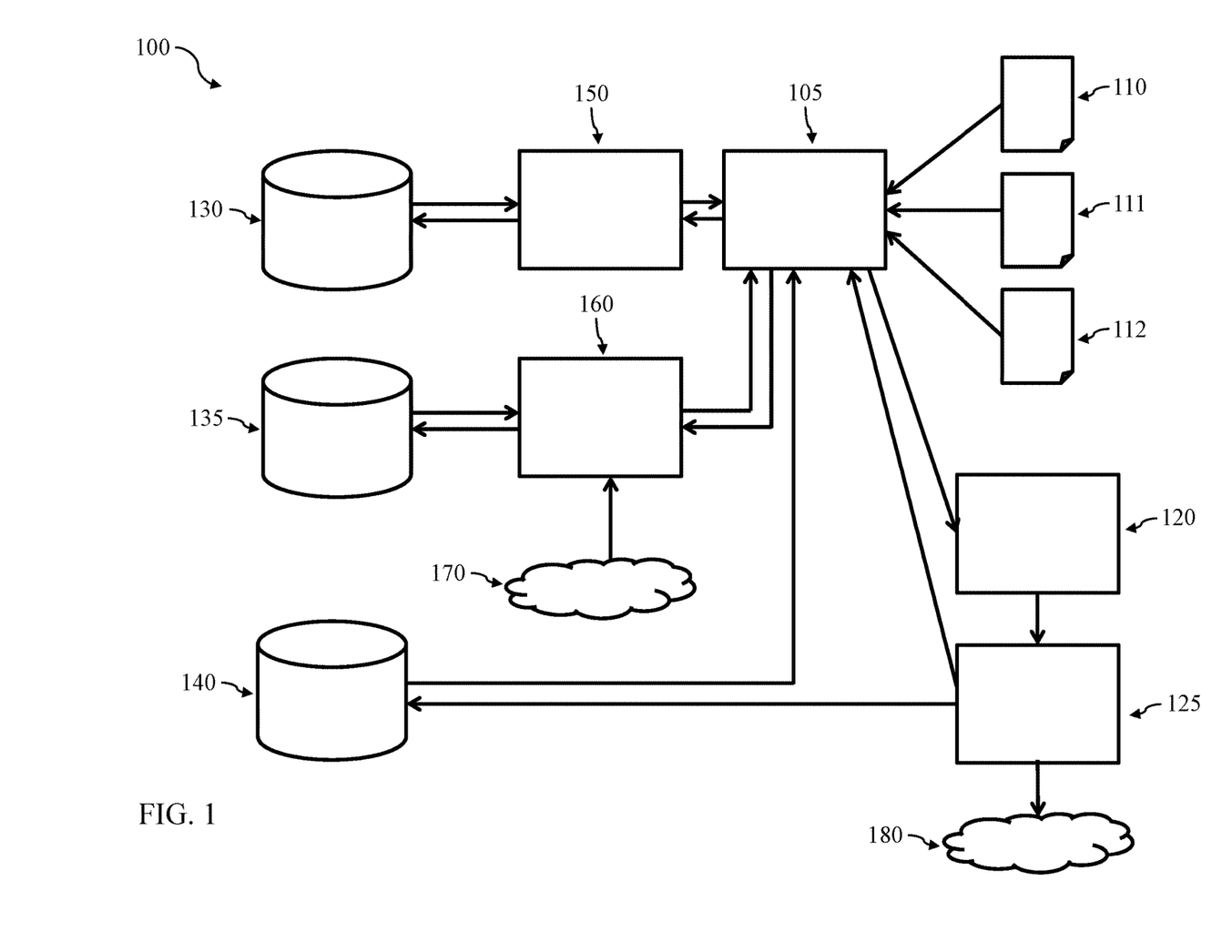
FIG. 1 illustrates a block diagram of a benchmarking system, according to an embodiment of the present invention.

FIG. 1 illustrates a block diagram of a benchmarking system 100, according to an embodiment of the present invention. The analysis orchestrator 105 accepts the user input, generates predictive performance results, predictive benchmark results, performance analysis reports, or benchmark summaries as output, and orchestrates the execution of the benchmarking system 100. The user input may be provided over the Internet or any computer network.

The static code analyzer 150 determines similarities between the source code of the application being benchmarked and the plurality of the applications in the custom benchmarks repository 130. For each pair of comparisons between the application being benchmarked and the plurality of the custom benchmarks in the custom benchmarks repository 130, a value is generated. A vector is created where each element of the vector represents a metric calculated by a specific comparison method. The methods used by the static code analyzer can include similarity detection algorithms. In alternative embodiments, only those methods which are able to fingerprint a single software in a space with norm may be used. Without a loss of generality, it can be assumed that a larger value of a distance metric means larger dissimilarity, the larger norm of the vector represents larger dissimilarity between the two source codes.

In an embodiment, when a new application is received for analysis, its skeleton is calculated using the method of Pedro C. Diniz, A COMPILER APPROACH TO PERFORMANCE PREDICTION USING EMPIRICAL-BASED MODELING. The skeleton extracts the structure of the program relevant for the application performance, abstracting away all the unnecessary details. Next, the methods of Saul Schleimer, Daniel S. Wilkerson, Alex Aiken "Moss: A System for Detecting Software Plagiarism", SIGMOD 2003, Jun. 9-12, 2003, San Diego, Calif. (available at http://theory.stanford.edu/~aiken/moss/), and H. L. Berghel and D. L. Sallach, "Measurements of program similarity in identical task environments", SIGPLAN Notices, vol. 9, no. 8, pp. 65-76, 1984, are used to calculate metrics of similarity between the skeleton of the application being analyzed and the skeletons of the previously run applications. These skeletons represent custom benchmarks and are stored in the custom benchmark repository 130. The method of Schleimer et al. teaches a method that given a source code computes feature vector as frequencies of idioms and tokens in the two source codes. The methods of Berghel et al. look for similarity by comparing 'program profiles'. Such profiles are created by feature extraction routines which map each program onto a feature vector tuple $<f_1, f_2, \ldots, f_n>$ where each $f_i$ is a count of an occurrence of a particular feature. These counts form part of the computed feature vector.

The static workload analyzer 160 accepts as input typical application usage description (a structured, machine-readable manifest file) that describes features, such as expected number of connections, expected transaction types, expectations for business cycle, expectations for trends in demand, or maximal and minimal number of requests of a given type. NFR Workload Analyzer uses this description to select most workload compatible custom benchmarks from the custom benchmarks repository 130 as well as most workload compatible benchmarks from the standard benchmark repository 135. The system starts from an empty custom benchmark repository 130 and a pre-populated standard benchmark repository 135. In an embodiment, each benchmark in a standard benchmark repository 135 is a skeleton of a standard benchmark created by using the method of Diniz et al. In addition, each standard benchmark is accompanied by workload descriptors, infrastructure alternatives descriptions, and performance results for these workloads and alternatives. Each time a new application arrives for predictive benchmarking, the system creates a skeleton out of it and determines the similarity to the skeletons and associated workload descriptors in the custom benchmark repository 130 first and then in the standard benchmark repository 135, and makes predictions on the performance of the application. If no sufficiently similar benchmark from either repository is found, the system runs the application skeleton, and a new custom benchmark is created and added to the custom benchmarks repository 130. As such, the system learns new custom benchmarks.

The historic runs repository 140 contains summaries or reports of running specific custom benchmarks on a specific infrastructure. The infrastructure can include cloud provider services, such as Amazon Web Services, Microsoft Azure, or Google cloud. The infrastructure can also include various configurations of computer clusters within the same provider.

The custom benchmark generator 120 generates a custom benchmark, including transactions and data, based on a typical usage description. The custom benchmark generator 120 is used when either no custom benchmark in the custom benchmark repository is found that is sufficiently similar to the given application or the workload descriptor of the given application is not sufficiently similar to the workload descriptors of the custom benchmarks or no historic run exists for the typical usage description for a specific infrastructure alternative.

Figure 2:
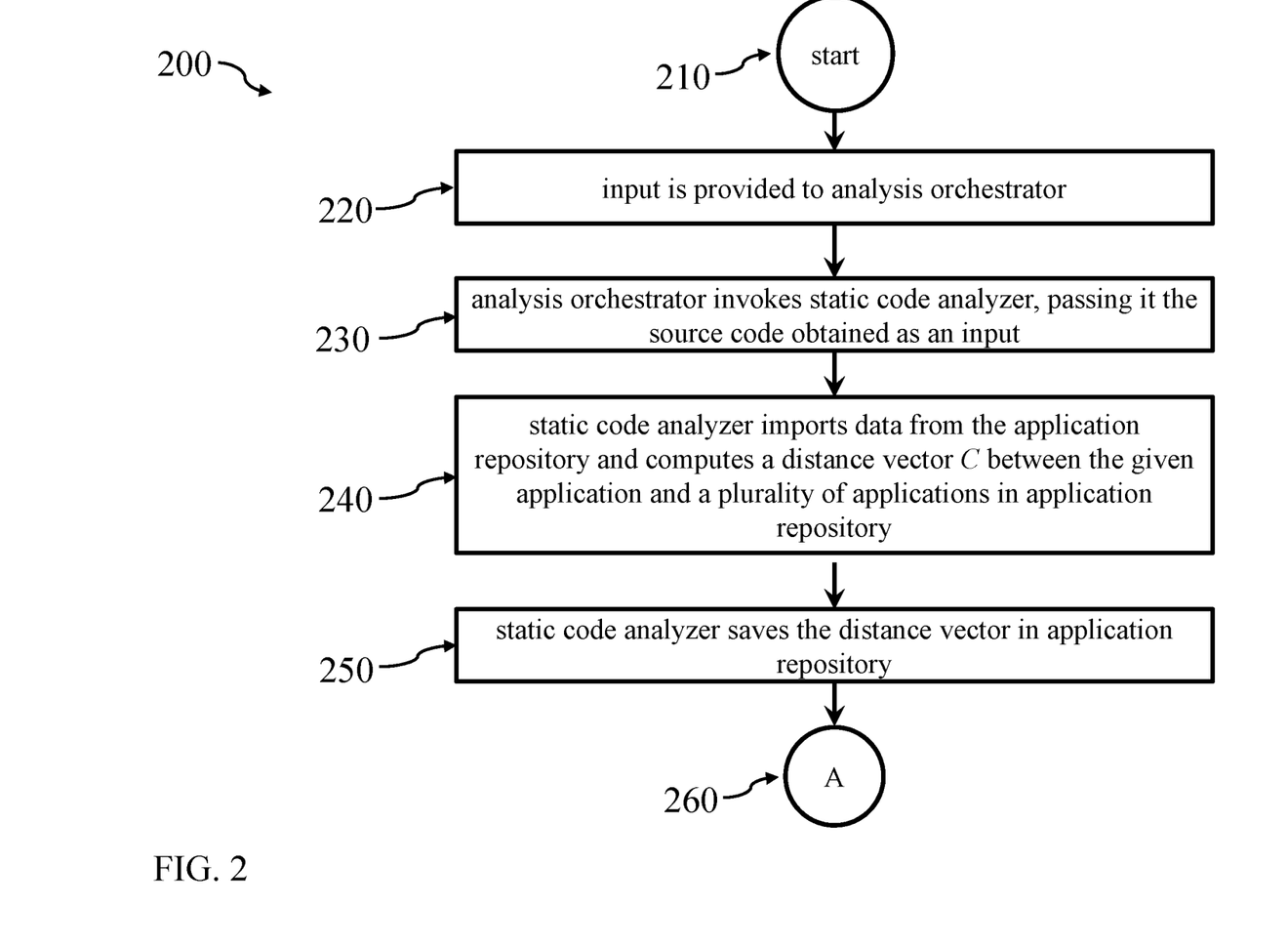
FIG. 2 illustrates a flow chart of the process of a benchmarking system, according to an embodiment of the present invention.

The benchmark executor 125 executes a benchmark on the infrastructure alternatives (possibilities for infrastructures) provided as the input. The infrastructures alternatives may down select a subset of all possible configurations and limit the number of cases analyzed. The benchmarks are run periodically on custom benchmarks from the custom benchmarks repository 130 to refresh the records in historic runs repository 140. By refreshing the results in the historic runs repository 140, the system can apply automated or semi-automated learning and rebalance the predictions based on the observed results using feedback. FIG. 2 illustrates a flow chart 200 of the process of a benchmarking system, according to an embodiment of the present invention. In step 210, the process starts. In step 220, the analysis orchestrator receives a set of input. The set of input includes the application source code 110, the typical usage description manifest 111, and the infrastructure alternatives description 112. In step 230, the analysis orchestrator sends the application source code 110 to the static code analyzer. In step 240, the static code analyzer then imports data from the custom benchmark repository and computes a distance vector C between the given application and a plurality of applications in custom benchmark repository.

Next, the feature vectors computed on the two source codes are used to compute a similarity distance between the two source codes as the distance between the two feature vectors. Initially weights given to vector dimensions are equal. However, as the system continues to run, the quality of prediction is fed back to the system, and the weights are automatically adjusted to match the observed data. This means that the more examples the system sees, the better the similarity distance vector weights selection will be, and the quality of performance prediction improves. In another embodiment, the feature vector computed using methods of Schleimer et al. and Berghel et al. can serve as input for K-Means clustering. When the system receives a new application as an input, the system will calculate its feature vector as described above. Then this feature vector is used to calculate the application distance from all other custom benchmarks, which results in a specific clustering. The specific method of clustering is repeatedly tested, for example, using Minkowski distance, and adjustments to the feature weighting according to the observed data are made to improve clustering over time.

In another embodiment, a collaborative filtering method, e.g., item based collaborative filtering (see Sarwar, Badrul, et al. "Item-based collaborative filtering recommendation algorithms." *Proceedings of the* 10*th international conference on World Wide Web*. ACM, 2001, available at https://www.google.co.il/url?sa=t&rct=j&q=&esrc=s&source=web&cd=1&cad=rja&uact=8&ved=0ahUKEwj1t6jv3PfOAhUGISwKHbIJCbgQFggaMAA&url=http%3A%2F%2Fgrouplens.org% 2Fsite-content%2Fuploads%2FItem-Based-WWW-2001.pdf&usg=AFQjCNGdQ39dnsEKqh6Ve6uJ9sXgRPXJ4Q&sig2=S1Q7HtzOChlo61JZCuE-mA&bvm=bv.131783435,d.bGg), can be used for finding similarity between the application and custom benchmarks. More specifically, in this disclosure, the applications are mapped from the custom benchmark repository to "items" and features from the feature vector above to "users" (see Schleimer, FIG. 2). When a new application arrives, the matrix of custom benchmarks as columns and similarity features as rows is used to isolate the set of most similar applications following methods described in section 3.2 in Sarwar et al. Next, this set is used to predict performance of the application at hand as in the embodiment described above.

In addition to finding similarity between the given application and custom benchmarks, similarity between the typical usage of this application and the typical usage of the custom benchmarks is found. The output of the method is a vector in a space with norm, and the distance between the vectors serves as a measure or metric of similarity or closeness between the new application workload and the custom benchmarks workloads. The similarity between two workload descriptors is calculated using metrics like minimal, maximal, and average number of connections, workload type encoded as a numbers (e.g., DB→1, CRM→2, ERP→3, Application Server→4) to allow working with the categorical data, number of transaction types, minimal, maximal, and average size of messages sent, etc. These metrics can be used as values in a distance vector and the norm of the vector serves as the distance measure.

When the new application runs, its actual performance and actual workload description are being monitored and the error between the observations and prediction is being recorded and fed back into a learning mechanism allowing improvements to the quality of prediction next time the system sees a similar skeleton and application workload descriptor.

The static code analyzer saves the distance vector in application repository in step 250. In step 260, the process continues to the flow chart 300 in FIG. 3.

Figure 3:
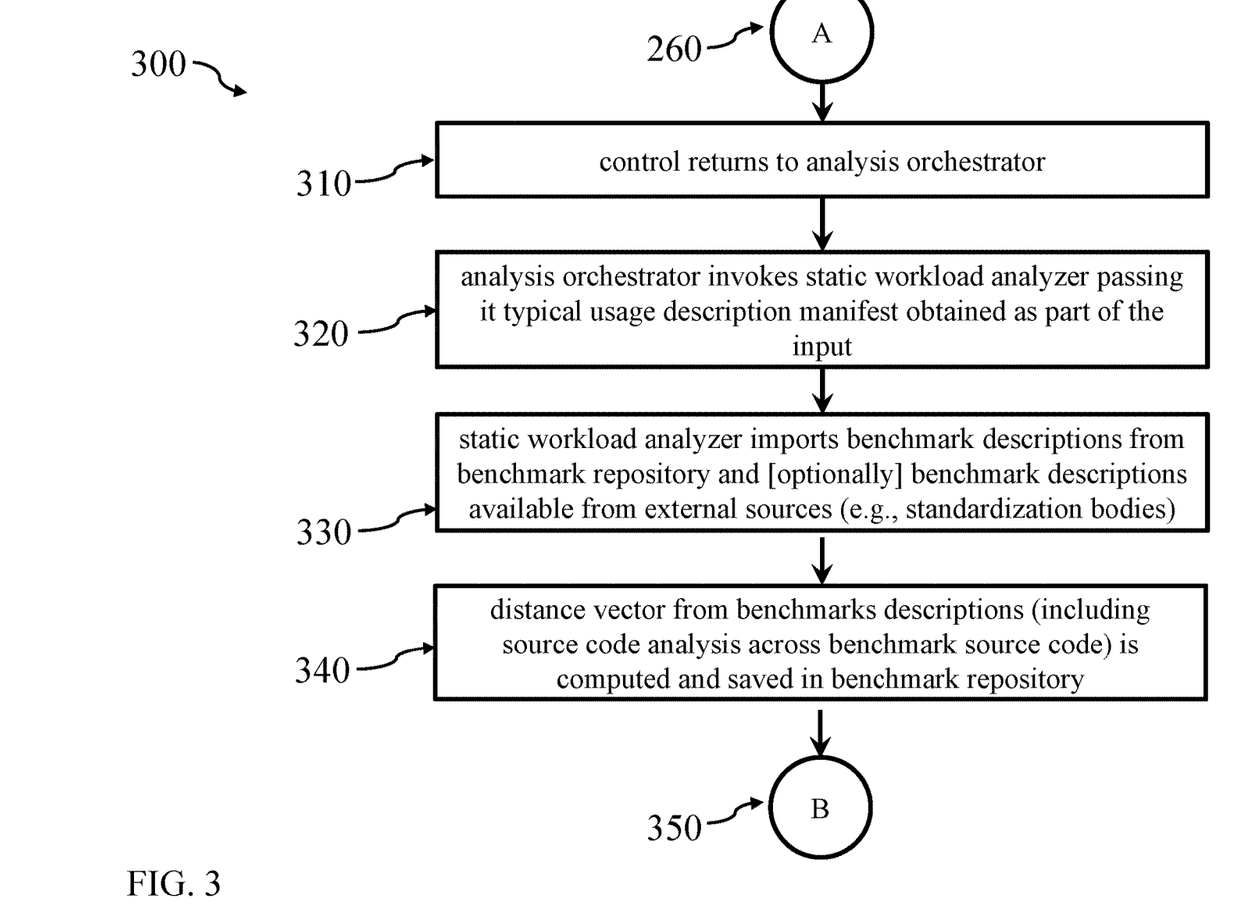
FIG. 3 illustrates a continuation flow chart of the process of a benchmarking system, according to an embodiment of the present invention.

FIG. 3 illustrates a continuation flow chart of the process of a benchmarking system, according to an embodiment of the present invention. In step 310, control returns to the analysis orchestrator. In step 320, the analysis orchestrator invokes workload analyzer, passing it the typical usage description manifest 111 obtained as part of the input in step 220. In step 330, the static workload analyzer imports benchmark descriptions from and can optionally import benchmark descriptions available from external sources, such as standardization bodies. In step 340, the distance vector from benchmarks descriptions, including source code analysis across benchmark source code, is computed and saved in benchmark repository. In step 350, the process continues to the flow chart 400 in FIG. 4.

Figure 4:
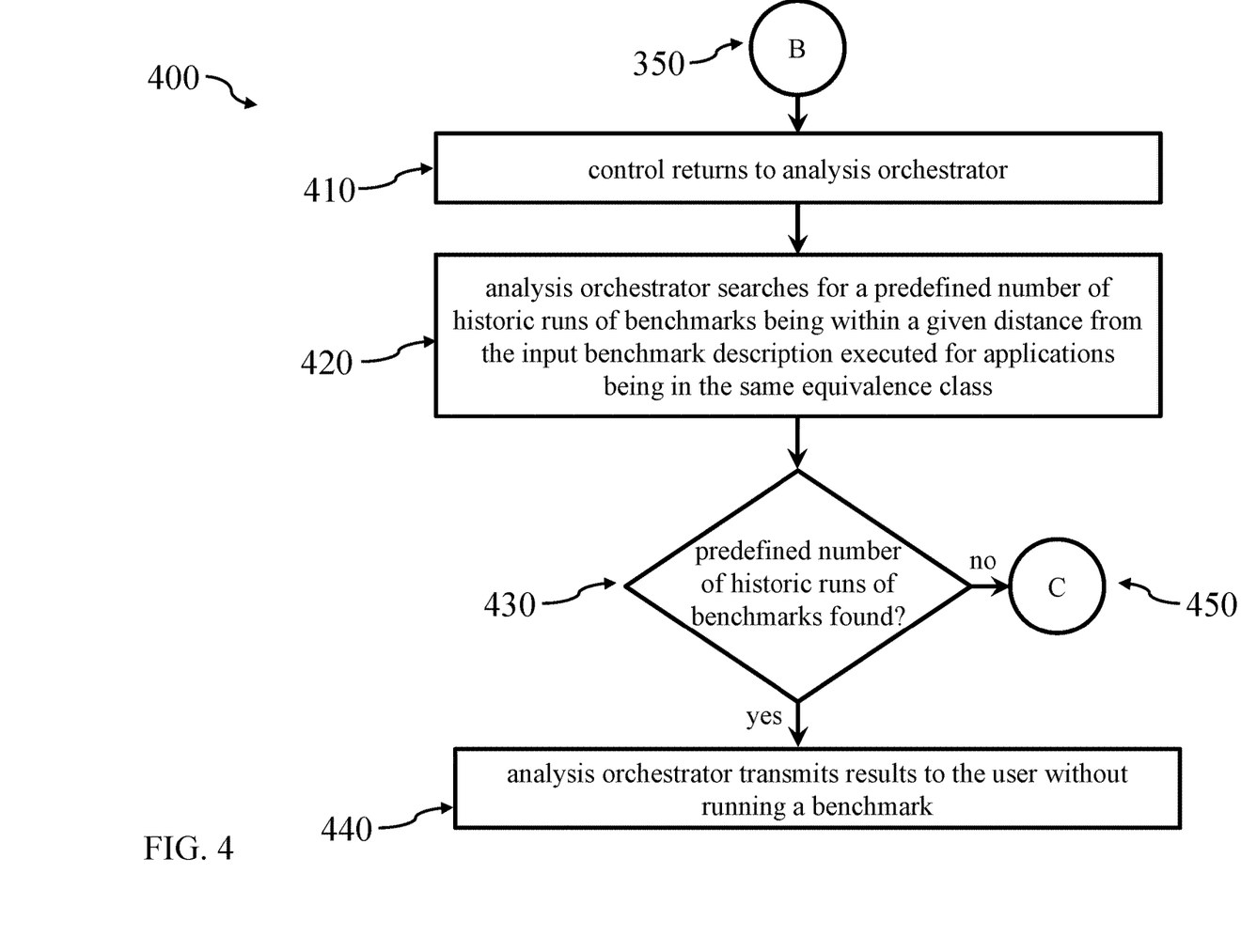
FIG. 4 illustrates a continuation flow chart of the process of a benchmarking system, according to an embodiment of the present invention.

FIG. 4 illustrates a continuation flow chart of the process of a benchmarking system, according to an embodiment of the present invention. In step 410, control returns to the analysis orchestrator. In step 420, the analysis orchestrator searches for a predefined number of historic runs of benchmarks being within a given distance in a space with norm from the input benchmark description executed for applications being in the same equivalence class. In the decision block 430, the process will continue to step 440 if the predefined number of historic runs of benchmarks are found. Otherwise, the process continues to step 450 and the flow chart 500 in FIG. 5. In step 440, the analysis orchestrator transmits results to the user without running a benchmark.

Figure 5:
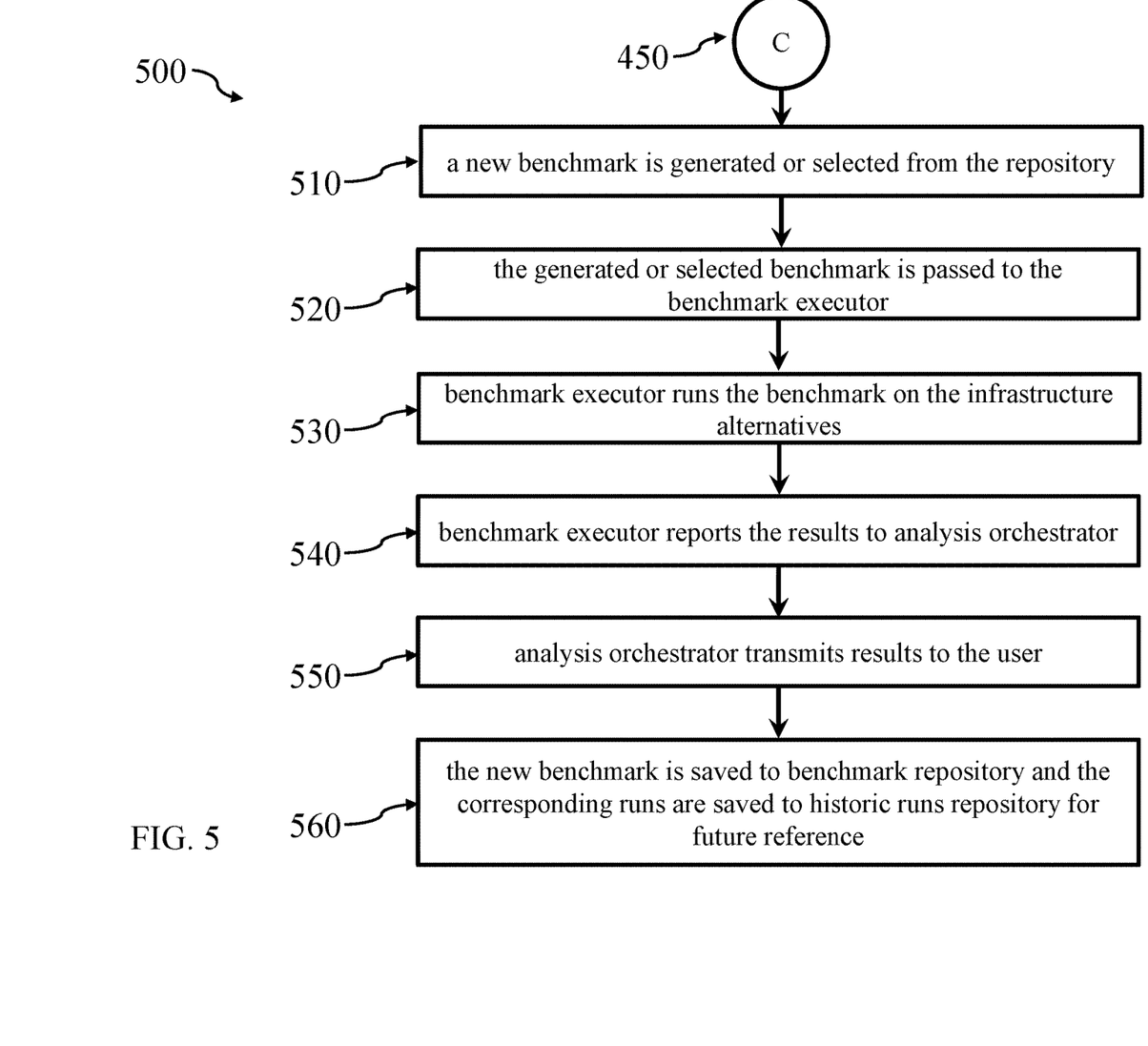
FIG. 5 illustrates a continuation flow chart of the process of a benchmarking system, according to an embodiment of the present invention.

FIG. 5 illustrates a continuation flow chart of the process of a benchmarking system, according to an embodiment of the present invention. In step 510, a new benchmark is generated or selected from the repository. In step 520, the generated or selected benchmark is passed to the benchmark executor. In step 530, the benchmark executor runs the benchmark on the infrastructure alternatives. In step 540, the benchmark executor reports the results to analysis orchestrator. In step 550, the analysis orchestrator transmits results to the user. In step 560, the new benchmark that was created in step 530 is saved to benchmark repository, the corresponding runs are saved to historic runs repository for future reference, and the process ends.

As shown, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that The computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. A system for generating performance benchmark results of applications:

a benchmarks repository comprising a plurality of results of running a plurality of benchmarks of application classes on a plurality of computing infrastructures; and a server comprising a processor, memory accessible by the processor, and computer program instructions stored in the memory and executable by the processor and configured to:

i. receive an application source code, an infrastructure alternative, and a usage description of the application, the usage description describing at least one of an expected number of connections, expected transaction types, expectations for a business cycle, expectations for trends in demand, and maximal and minimal number of requests of a given type;

ii. perform static analysis on the application source code by comparing a plurality of points in the application source code with a plurality of points in at least one benchmarked application class to determine a similarity of the application to a benchmarked application class on the received infrastructure alternative in the benchmarks repository comprising a plurality of results of running a plurality of benchmarks of application classes on a plurality of computing infrastructures, wherein each comparison of each of the plurality of points generates a value and the plurality of values form a similarity vector, wherein the comparison of each of the plurality of points is determined based on at least one of a minimal, maximal, and average number of connections, a workload type encoded, a number of transaction types, minimal, maximal, and average size of messages sent, and wherein each of the plurality of values of the formed similarity vector is weighted and the weights are adjusted based on an observed quality of prediction over time;

iii. perform analysis on the usage description to determine a similarity to known usage, wherein the similarity is determined using the generated similarity vector; and iv. when the similarity of the application to known application classes is below a first threshold or the similarity to known usage is below a second threshold, generate a new custom benchmark from the application, execute it on the infrastructure alternative, and add the new benchmark to the benchmarks repository; and v. when the similarity of the application to known application classes is above the first threshold and the similarity to known usage is above the second threshold, generate a benchmark result for of the application based on results from the benchmark repository.

2. The system of claim 1, wherein the predictive benchmark result is based on the infrastructure alternative.

3. The system of claim 1, wherein generating the new custom benchmark comprises generating an application skeleton from static code analysis and using the application skeleton along with the workload descriptor as the new custom benchmark.

4. The system of claim 1, further comprising a workload analyzer.

5. The system of claim 4, wherein the workload analyzer is configured to receive from the server the usage description and select at least one standard benchmark from a standard benchmarks repository.

6. The system of claim 5, wherein the standard benchmark repository comprises at least one standard benchmark source code.

7. The system of claim 1, wherein the usage description comprises an expected number of connections.

8. The system of claim 1, wherein the usage description comprises an expected transaction type.

9. The system of claim 1, wherein the usage description comprises an expectation for business cycle.

10. The system of claim 1, wherein the usage description comprises an expectation for trends in demand.

11. The system of claim 1, wherein the usage description comprises a maximal number of requests of a given type.

12. The system of claim 1, wherein the usage description comprises a minimal number of requests of a given type.

13. The system of claim 1, wherein generating a performance prediction result comprises using a historic run result in a historic run repository.

14. A method for system for generating performance benchmark results of applications, the method comprising:
in a server comprising a processor, memory accessible by the processor, and computer program instructions stored in the memory and executable by the processor, receiving a source code for an application that is executable on a computing infrastructure;
receiving a usage description of the application, the usage description describing at least one of an expected number of connections, expected transaction types, expectations for a business cycle, expectations for trends in demand, and maximal and minimal number of requests of a given type;
performing static analysis on the source code by comparing a plurality of points in the application source code with a plurality of points in at least one benchmarked application class to determine a similarity of the application to a benchmarked application class on the computing infrastructure in a benchmarks repository comprising a plurality of results of running a plurality of benchmarks of application classes on a plurality of computing infrastructures, wherein each comparison of each of the plurality of points generates a value and the plurality of values form a similarity vector, wherein the comparison of each of the plurality of points is determined based on at least one of a minimal, maximal, and average number of connections, a workload type encoded, a number of transaction types, minimal, maximal, and average size of messages sent, and wherein each of the plurality of values of the formed similarity vector is weighted and the weights are adjusted based on an observed quality of prediction over time;
performing analysis on the usage description to determine a similarity to known usage, wherein the similarity is determined using the generated similarity vector; and
when the similarity of the application to known application classes is below a first threshold or the similarity to known usage is below a second threshold, generate a new custom benchmark from the application, execute it on the infrastructure alternative, and add the new benchmark to the benchmarks repository; and
when the similarity of the application to known application classes is above the first threshold and the similarity to known usage is above the second threshold, generate a benchmark result for of the application based on results from the benchmark repository.

15. The method of claim 14, further comprising the steps of receiving an infrastructure alternative and wherein generating a performance prediction result is based on an infrastructure alternative.

16. The method of claim 15, wherein performing analysis on the usage description comprises selecting at least one workload compatible standard benchmark from a standard benchmarks repository.

17. The method of claim 14, wherein the usage description comprises an expected number of connections.

* * * * *